(12) United States Patent
Sato

(10) Patent No.: US 11,194,469 B2
(45) Date of Patent: Dec. 7, 2021

(54) IMAGE PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Tomoya Sato, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 897 days.

(21) Appl. No.: 15/630,855

(22) Filed: Jun. 22, 2017

(65) Prior Publication Data

US 2017/0371537 A1    Dec. 28, 2017

(30) Foreign Application Priority Data

Jun. 24, 2016  (JP) .............................. JP2016-125589

(51) Int. Cl.
| | |
|---|---|
| *G06F 17/00* | (2019.01) |
| *G06F 3/0488* | (2013.01) |
| *G06F 3/0489* | (2013.01) |
| *H04N 1/00* | (2006.01) |

(52) U.S. Cl.
CPC ........ *G06F 3/04886* (2013.01); *G06F 3/0489* (2013.01); *H04N 1/00384* (2013.01); *H04N 1/00411* (2013.01)

(58) Field of Classification Search
CPC .... G06F 21/36; G06F 3/04886; G06F 3/0489; H04N 1/00384; H04N 1/00411
USPC .................................................. 715/255, 740
See application file for complete search history.

(56) References Cited

U.S. PATENT DOCUMENTS

| | | | | |
|---|---|---|---|---|
| 8,762,876 | B2* | 6/2014 | Puppin .................... | G06F 21/36 |
| | | | | 715/773 |
| 9,189,657 | B2* | 11/2015 | Ichimi ..................... | G06F 21/84 |
| 9,552,465 | B2* | 1/2017 | Pike ........................ | G07F 7/1041 |
| 9,805,537 | B2* | 10/2017 | Kunori .................... | G07F 7/1033 |
| 9,874,940 | B2* | 1/2018 | Kadomatsu .............. | G06F 3/02 |
| 10,515,363 | B2* | 12/2019 | Quigley .................. | G06Q 20/353 |

(Continued)

FOREIGN PATENT DOCUMENTS

| | | |
|---|---|---|
| CN | 1734410 A | 2/2006 |
| CN | 1313906 C | 5/2007 |

(Continued)

*Primary Examiner* — Stephen S Hong
*Assistant Examiner* — Matthew J Ludwig
(74) *Attorney, Agent, or Firm* — Canon U.S.A., Inc. IP Division

(57) ABSTRACT

An image processing apparatus described in the present specification includes a display unit configured to display a software keyboard, a reception unit configured to receive a signal transmitted from the information processing apparatus based on a depression of a keyboard, a storage unit configured to store the signal received by the reception unit in association with information about a hardware key provided on the image processing apparatus, and a control unit configured to display a character based on the signal received by the reception unit on the display unit in a case where the software keyboard is being displayed by the display unit, and to perform processing corresponding to a depression of the hardware key information about which is stored in the storage unit in association with the signal received by the reception unit in a case where the software keyboard is not being displayed by the display unit.

10 Claims, 11 Drawing Sheets

| 801 | 802 |
|---|---|
| KEY ON KEYBOARD | HARDWARE KEY |
| 's' | START KEY |
| 't' | STOP KEY |
| 'r' | RESET KEY |
| 'u' | SET/REGISTER KEY |
| 'i' | ID KEY |

(56) References Cited

U.S. PATENT DOCUMENTS

| | | | |
|---|---|---|---|
| 2005/0212763 A1* | 9/2005 | Okamura | G06F 21/36 345/156 |
| 2008/0291059 A1* | 11/2008 | Longe | G06F 3/0237 341/22 |
| 2011/0041049 A1* | 2/2011 | Verdier | G06F 40/103 715/227 |
| 2012/0235921 A1* | 9/2012 | Laubach | G06F 3/0238 345/172 |
| 2013/0120267 A1* | 5/2013 | Pasquero | G06F 40/274 345/168 |
| 2013/0246329 A1* | 9/2013 | Pasquero | G06F 3/04886 706/52 |

FOREIGN PATENT DOCUMENTS

| | | |
|---|---|---|
| CN | 101052939 A | 10/2007 |
| CN | 105659194 A | 6/2016 |
| JP | 2004-070888 A | 3/2004 |
| JP | 2005-284375 A | 10/2005 |
| JP | 2007-058538 A | 3/2007 |

\* cited by examiner

IMAGE PROCESSING APPARATUS, METHOD FOR CONTROLLING THE SAME, AND STORAGE MEDIUM

BACKGROUND

Field of the Disclosure

The present disclosure relates to an image processing apparatus, a method for controlling the image processing apparatus, and a storage medium.

Description of the Related Art

There is proposed a method for operating through Virtual Network Computing (VNC) an image processing apparatus having a display from an information processing apparatus, such as a personal computer (PC), located in a place physically distant from the image processing apparatus. In this method, a screen displayed on the display of the image processing apparatus is displayed on a display of the information processing apparatus. Japanese Patent Application Laid-Open No. 2005-284375 discusses a technique for enabling operation of an image processing apparatus located in a distant place with a user performing an operation on a display of an information processing apparatus.

In the above-described image processing apparatus, the user may be able to remotely operate hardware keys, such as Start and Clear keys, provided on the image processing apparatus from the hardware keyboard of the information processing apparatus during VNC connection. The image processing apparatus stores the key codes of the hardware keys of the image processing apparatus in association with the character codes of the keys of the hardware keyboard of the information processing apparatus. In a case where the user wishes to operate a hardware key of the image processing apparatus during VNC connection, the user presses the key on the keyboard corresponding to the target hardware key. The image processing apparatus receives the character code corresponding to the key on the keyboard pressed by the user from the information processing apparatus, and performs processing corresponding to the depression of the hardware key according to the key code of the hardware key corresponding to the received character code.

For example, in a case where the Reset key of the image processing apparatus corresponds to the "r" key on the keyboard of the information processing apparatus, in response to the user pressing the "r" key, the image processing apparatus performs processing for executing an operation to be performed with (corresponding to) the depression of the Reset key of the image processing apparatus.

Conventionally, the above-described image processing apparatus performs processing corresponding to the depression of the hardware key corresponding to the character code received from the external information processing apparatus and a character cannot be input with a received character code.

To that end, it is assumed to make it possible to input a character from the hardware keyboard of the external information processing apparatus by inputting a character by using the character code received by the image processing apparatus.

In a case where the image processing apparatus receives a character code corresponding to a hardware key, the image processing apparatus needs to switch between processing for inputting the character of the received character code and processing corresponding to the depression of the hardware key corresponding to the received character code.

For example, in a case where the user presses the "r" key on the keyboard, the image processing apparatus receives the character code for "r". The image processing apparatus that has received the character code for "r" needs to switch between processing for inputting the character "r" and processing corresponding to the depression of the Reset key depending on the situation.

SUMMARY

According to an aspect of the present exemplary embodiment, an image processing apparatus connectable with an information processing apparatus includes a display unit configured to display a software keyboard, a reception unit configured to receive a signal transmitted from the information processing apparatus based on a depression of a keyboard connected to the information processing apparatus, a storage unit configured to store the signal received by the reception unit in association with information about a hardware key provided on the image processing apparatus, and a control unit configured to display a character based on the signal received by the reception unit on the display unit in a case where the software keyboard is displayed by the display unit, and to perform processing corresponding to a depression of the hardware key information about which is stored in the storage unit in association with the signal received by the reception unit in a case where the software keyboard is not displayed by the display unit.

Further features of the present disclosure will become apparent from the following description of exemplary embodiments with reference to the attached drawings.

DESCRIPTION OF THE EMBODIMENTS

Exemplary embodiments described in the present specification will be described below with reference to the accompanying drawings. A first exemplary embodiment of the present disclosure will be described below.

Hereinafter, an image processing apparatus is referred to as a server, and an information processing apparatus such as an external PC connected to the server through Virtual Network Computing (VNC) is referred to as a client.

Figure 1:
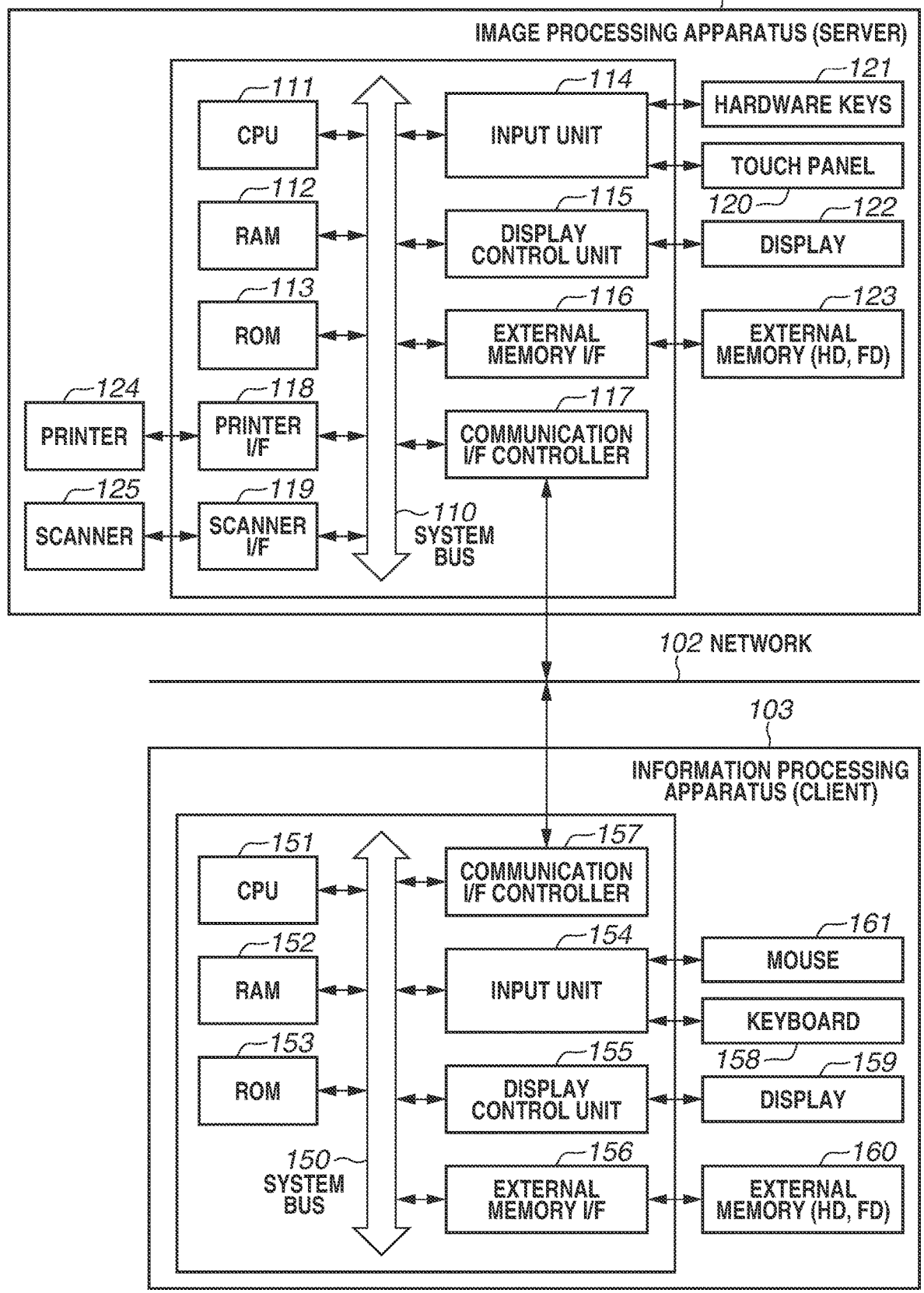
FIG. 1 illustrates a hardware configuration according to one or more aspects of the present disclosure.

FIG. 1 illustrates an entire information processing system according to the exemplary embodiments described in the present specification.

The information processing system includes an image processing apparatus 101 serving as a server for transmitting a display screen, and an information processing apparatus 103 serving as a client for receiving the display screen of the image processing apparatus 101. The image processing apparatus 101 and the information processing apparatus 103 are connected with each other via a network 102, such as a local area network (LAN).

A hardware configuration of the image processing apparatus (server) 101 will be described below. Referring to FIG. 1, a central processing unit (CPU) 111, a random access memory (RAM) 112, a read only memory (ROM) 113, an input unit 114, a display control unit 115, an external memory interface (I/F) 116, a communication I/F controller 117, a printer I/F 118, and a scanner I/F 119 are connected to a system bus 110. A touch panel 120 and hardware keys 121 are connected to the input unit 114. A display 122 is connected to the display control unit 115. An external memory 123 is connected to the external memory I/F 116. A printer 124 is connected to the printer I/F 118. The printer (printing unit) prints an image data on a sheet. A scanner 125 is connected to the scanner I/F 119. The scanner (reading unit) reads a document to generate image data. The units connected to the system bus 110 are configured to exchange data with each other via the system bus 110.

The ROM 113 is a nonvolatile memory storing image data, non-image data, and various programs for the CPU 111 to operate.

The RAM 112 is a volatile memory used as a main memory of the CPU 111 and a temporary storage area, such as a work area.

The CPU 111 loads a program stored in the ROM 113 into the RAM 112 and executes the program to control each unit of the image processing apparatus 101. A program for the CPU 111 to operate is not limited to one stored in the ROM 113 and may be prestored in the external memory 123 (such as a hard disk).

The input unit 114 receives a user operation, generates a control signal corresponding to the user operation, and supplies the generated control signal to the CPU 111. The input unit 114 is connected with the touch panel 120 and the hardware keys 121 as an input device for receiving user operations. The touch panel 120 is an input device which outputs coordinates information corresponding to a touched position on a planarly configured input portion. The touch panel 120 may be a touch panel of any one of various types including the resistance film type, capacitance type, surface elastic wave type, infrared type, electromagnetic induction type, image recognition type, and optical sensor type.

The hardware keys 121 including numerical keys, a Start key, and a Stop key are input devices which can be physically pressed. The input unit 114 generates a control signal in response to a user operation performed on each input device. The CPU 111 controls each unit of the image processing apparatus 101 according to a generated control signal and a program read from the ROM 113.

The display control unit 115 outputs a display signal for displaying an image on the display 122. For example, a display control signal generated by the CPU 111 according to a program is supplied to the display control unit 115. The display control unit 115 generates a display signal based on the display control signal and outputs the display signal to the display 122. The display control unit 115 configures a graphical user interface (GUI) based on the display control signal generated by the CPU 111, and displays the configured GUI screen on the display 122.

The display 122 is integrally formed with the touch panel 120. For example, the display 122 and the touch panel 120 are configured in such a manner that the touch panel 120 has a light transmittance with which the display of the display 122 is not interrupted. The touch panel 120 is attached to the upper layer of the display 122. The input coordinates indicating the user's touch position on the touch panel 120 are associated with the display coordinates on the display 122. This configuration allows the user to perform an operation as if the user directly touches a screen displayed on the display 122.

The external memory 123, such as a hard disk (HD), floppy disk (FD), compact disc (CD), digital versatile disc (DVD), and memory card, can be attached to the external memory I/F 116. The CPU 111 reads and writes data from/to the external memory 123 attached via the external memory I/F 116.

The CPU 111 communicates with various wired and/or wireless networks 102, such as a LAN and the Internet via the communication I/F controller 117. The scanner I/F 119 controls image input from the scanner 125. The printer I/F 118 controls image output to the printer 124. The scanner 125 reads a document placed on a document positioning plate to generate image data. The printer 124 prints image data received via the printer I/F 118 on a sheet.

The hardware configuration of the information processing apparatus (client) 103 will be described below with reference to FIG. 1.

Referring to FIG. 1, a CPU 151, a RAM 152, a ROM 153, an input unit 154, a display control unit 155, an external memory I/F 156, and a communication I/F controller 157 are connected to a system bus 150. A keyboard 158 and a mouse 161 are connected to the input unit 154. A display 159 is connected to the display control unit 155. An external memory 160 is connected to the external memory I/F 156. The keyboard 158 is a hardware keyboard, which is hereinafter referred to as a keyboard.

The above-described units connected to the system bus 150 are configured to exchange data with each other via the system bus 150.

The ROM 153 is a nonvolatile memory storing, in predetermined areas, image data, non-image data, and various programs for the CPU 151 to operate.

The RAM 152 is a volatile memory used as a main memory of the CPU 151 and a temporary storage area, such as a work area. For example, the CPU 151 loads a program stored in the ROM 153 into the RAM 152 and executes the program to control each unit of the information processing apparatus 103. A program for the CPU 151 to operate is not limited to one stored in the ROM 153 and may be prestored in the external memory 160 (e.g., a hard disk).

The input unit 154 receives a user operation, generates a control signal corresponding to the operation, and supplies the generated control signal to the CPU 151. The input unit 154 receives a signal corresponding to a user operation from an input device, such as the keyboard 158 and mouse 161. The CPU 151 controls each unit of the information processing apparatus 103 based on the control signal generated by the input unit 154 in accordance with a user operation performed on the input device. In this way, the CPU 151 in the information processing apparatus 103 performs processing for performing an operation corresponding to the user operation.

The display control unit 155 outputs a display signal for displaying an image to the display 159. The CPU 151 generates a display control signal and supplies the generated display control signal to the display control unit 155. The display control unit 155 generates a display signal based on the display control signal, and outputs the generated display signal to the display 159. For example, based on the display control signal generated by the CPU 151, the display control unit 155 generates a GUI screen and displays the screen on the display 159.

The external memory 160, such as a hard disk, floppy disk, CD, DVD, and memory card, can be attached to the external memory I/F 156. Under the control of the CPU 151, the external memory I/F 156 reads and writes data from/to the attached external memory 160. Under the control of the CPU 151, the communication I/F controller 157 communicates with various wired and/or wireless networks 102, such as a LAN and the Internet.

Figure 2:
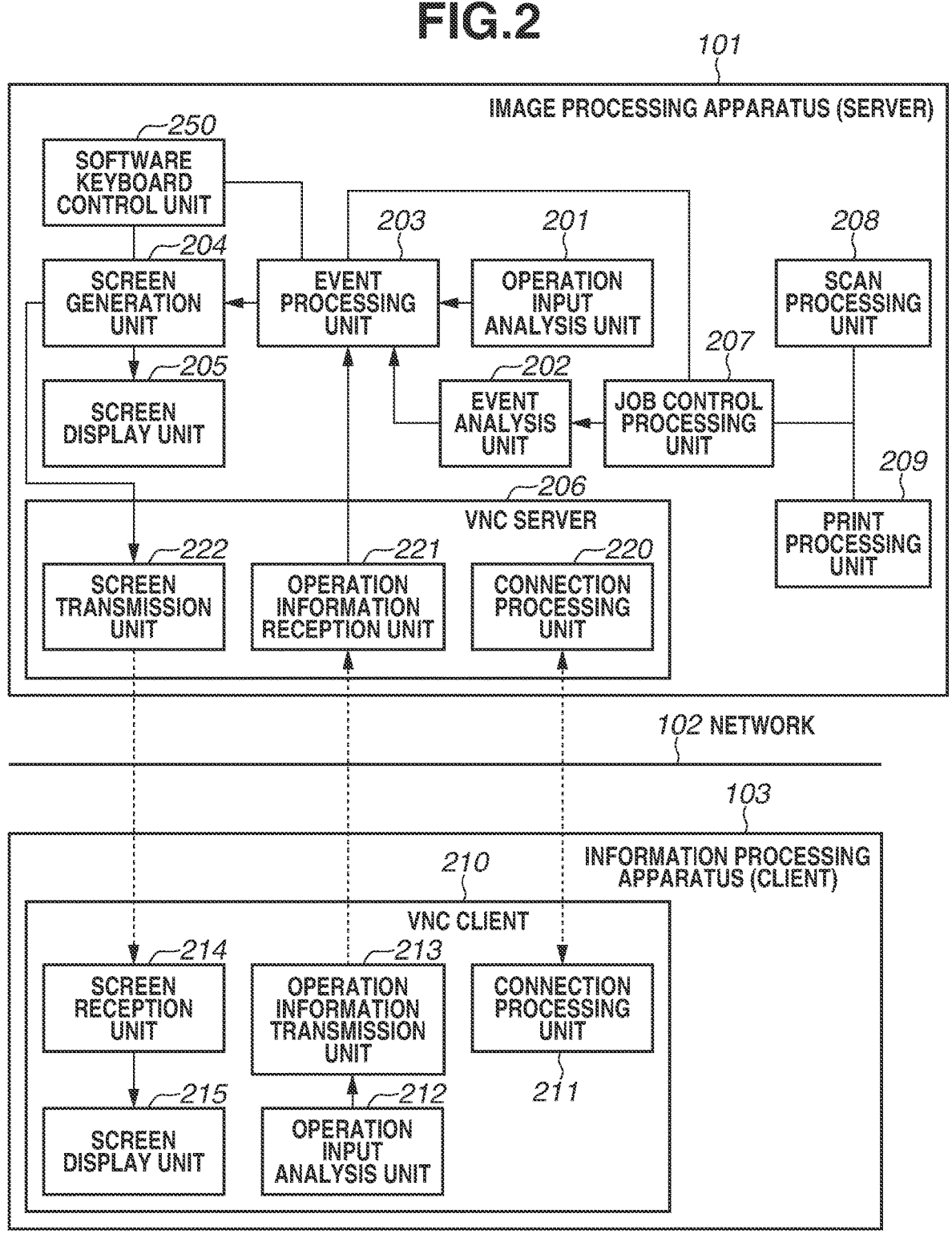
FIG. 2 illustrates software configurations according to an exemplary embodiment.

FIG. 2 illustrates software configurations of the image processing apparatus 101 and the information processing apparatus 103. Each software module in the image processing apparatus 101 is implemented by the CPU 111 reading a control program stored in the ROM 113 or external memory 123 and executing the control program. Each software module in the information processing apparatus 103 is implemented by the CPU 151 reading a control program stored in the ROM 153 or external memory 160 and executing the control program.

The image processing apparatus 101 includes an operation input analysis unit 201, an event analysis unit 202, an event processing unit 203, a screen generation unit 204, a display unit 205, a VNC server 206, and a job control processing unit 207. The image processing apparatus 101 further includes such software modules as a scan processing unit 208, a print processing unit 209, and a software keyboard control unit 250. The VNC server 206 includes such modules as a connection processing unit 220, an operation information reception unit 221, and a screen transmission unit 222.

The job control processing unit 207 controls software modules (some modules not illustrated) to control copy, print, and scan jobs to be executed by the image processing apparatus 101.

The scan processing unit 208 controls the scanner 125 via the scanner I/F 119 based on a command of the job control processing unit 207, to perform processing for reading a document placed on the document positioning plate of the scanner 125.

The print processing unit 209 controls the printer 124 via the printer I/F 118 based on a command of the job control processing unit 207, to perform processing for printing a specified image.

The operation input analysis unit 201 analyzes the control signal supplied from the input unit 114 and transmits an event corresponding to a user operation to the event processing unit 203. Events to be analyzed by the operation input analysis unit 201 include an event that the user touches the touch panel 120 and an event that the user presses a hardware key 121 of the image processing apparatus 101.

In addition to user operations, the event analysis unit 202 receives various phenomena occurring in the image processing apparatus 101 from the job control processing unit 207, analyzes the phenomena, and transmits events corresponding to the phenomena to the event processing unit 203. Events to be analyzed by the event analysis unit 202 are events, other than ones occurring with user operations, such as an event where a job ends and an event where print sheets run out.

The event processing unit 203 receives events from, for example, the operation input analysis unit 201, the event analysis unit 202, and the operation information reception unit 221. In response to a received event, the event processing unit 203 notifies the job control processing unit 207 and the software keyboard control unit 250 of the event to control each unit of the image processing apparatus 101.

The screen generation unit 204 performs processing for generating on the RAM 112 screen data to be displayed on the display 122.

The display unit 205 controls the display control unit 115 to display on the display 122 the screen data generated by the screen generation unit 204.

The software keyboard control unit 250 receives a notification from the event processing unit 203 and performs control to display a software keyboard screen. Processing by the software keyboard control unit 250 will be described in detail below. The software keyboard control unit 250 stores information indicating whether the software keyboard is currently displayed on the display 122.

The VNC server 206 is a software module for communicating with a VNC client 210 operating on the information processing apparatus 103 via the network 102. The connection processing unit 220 receives a connection request from the connection processing unit 211 of the VNC client 210 and performs connection processing.

The operation information reception unit 221 receives operation information from the operation information transmission unit 213 of the VNC client 210 and notifies the event processing unit 203 of an event corresponding to a user operation. Events transmitted by the operation information reception unit 221 are equivalent to events transmitted by the operation input analysis unit 201, i.e., events which occurs in response to a user operation to operate the image processing apparatus 101.

The screen transmission unit 222 performs processing for reading from the RAM 112 screen data generated by the screen generation unit 204 and transmitting the screen data to a screen reception unit 214 of the VNC client 210.

The VNC client 210 operates on the information processing apparatus 103. The VNC client 210 includes the connection processing unit 211, an operation input analysis unit 212, the operation information transmission unit 213, the screen reception unit 214, and a screen display unit 215. The connection processing unit 211 receives a request from the user and transmits a connection request to the connection processing unit 220 of the VNC server 206 to perform connection processing.

The operation input analysis unit 212 receives, via the input unit 154, an operation performed by the user by using the keyboard 158 and the mouse 161, analyzes the operation, and transmits information about the analyzed operation to the operation information transmission unit 213.

The operation information transmission unit 213 transmits the received operation information to the operation information reception unit 221 of the VNC server 206.

The screen reception unit 214 receives the screen data from the screen transmission unit 222 of the VNC server 206 and records the screen data in the RAM 152.

The screen display unit 215 reads from the RAM 152 the data received by the screen reception unit 214. The screen display unit 215 then controls the display control unit 155 to display the read image data on the display 159.

The communication between the VNC server 206 and the VNC client 210 is implemented by the CPU 111 and the CPU 151 controlling the communication I/F controller 117 and the communication I/F controller 157, respectively. The communication between the VNC server 206 and the VNC client 210 is performed in conformance with the Remote Frame Buffer (RFB) protocol.

A screen which is the same as the one displayed on the display 122 is also displayed on the display 159 of the information processing apparatus 103 through the processing by each of the above-described software modules. The user can perform various operations on the image processing apparatus 101 from a remote place by inputting an operation using the keyboard 158 and the mouse 161 of the information processing apparatus 103.

Figure 3:
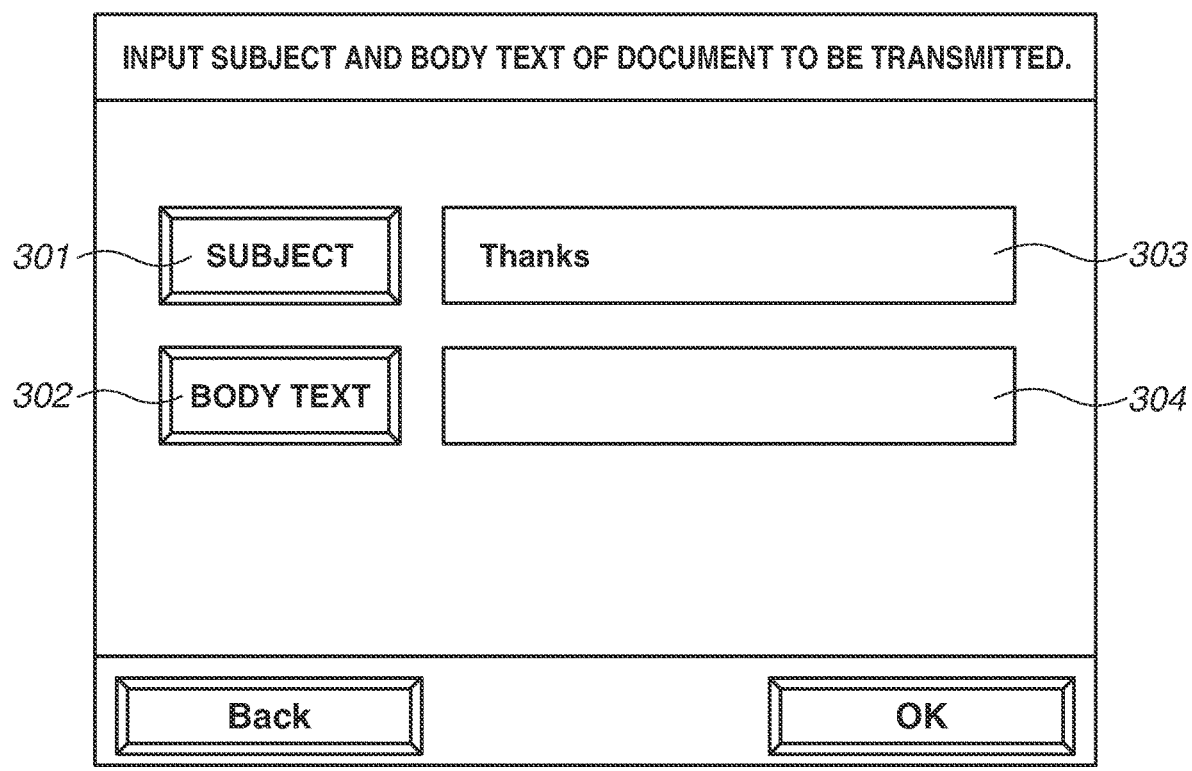
FIG. 3 illustrates an example of an operation screen displayed on a display of an image processing apparatus according to one or more aspects of the present disclosure.

FIG. 3 illustrates an example of a screen displayed on the display 122 of the image processing apparatus 101 according to the exemplary embodiments described in the present specification.

FIG. 3 illustrates an example of a screen for displaying a subject and body text in sending data scanned by the scanner 125 of the image processing apparatus 101 by e-mail. Referring to FIG. 3, the user sets the subject and body text of the e-mail. In response to the user touching a "Subject" key 301, the CPU 111 changes the screen displayed on the display 122 to a screen for inputting a subject. In response to the user touching a "body Text" key 302, the CPU 111 displays a screen for inputting a body text on the display 122. An input subject is displayed on a subject display field 303. FIG. 3 illustrates a state where a subject "Thanks" is already input. An input body text is displayed in a body text display field 304. Referring to FIG. 3, no text is input in the body text display field 304 yet.

Figure 4:
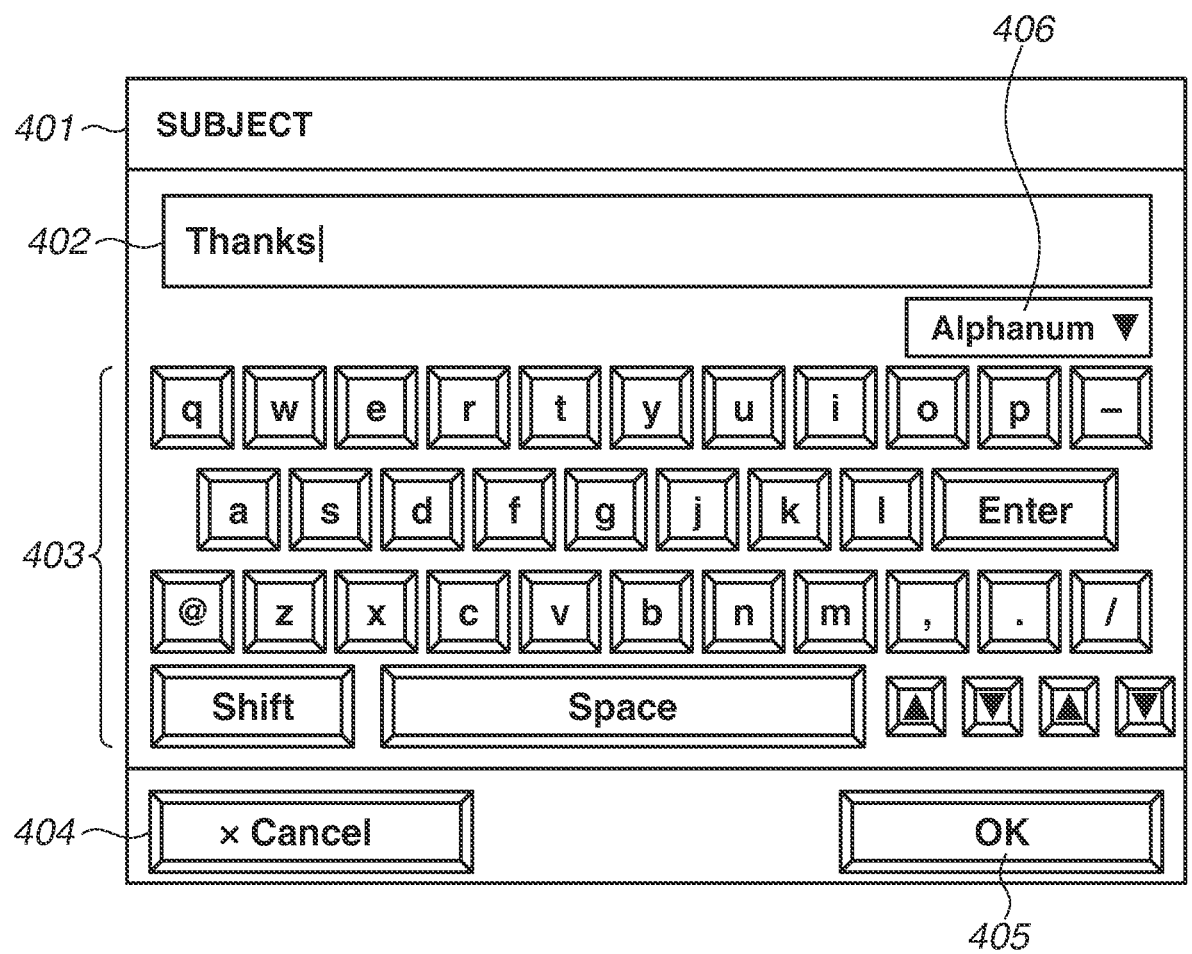
FIG. 4 illustrates a software keyboard screen displayed on the display of the image processing apparatus according to one or more aspects of the present disclosure.

In response to the user pressing any one of the "Subject" key 301, the "Body Text" key 302, the subject display field 303, and the body text display field 304, the CPU 111 displays the software keyboard screen illustrated in FIG. 4 on the display 122.

FIG. 4 illustrates the software keyboard screen displayed on the display 122 of the image processing apparatus 101 according to the exemplary embodiments described in the present specification. The image processing apparatus 101 according to the present exemplary embodiment does not have a hardware keyboard. The user input characters by touching the software keyboard displayed on the display 122.

The software keyboard screen is displayed on the display 122 under the control of the software keyboard control unit 250.

A title area 401 of the software keyboard screen displays information for indicating an input item to the user. Referring to FIG. 4, the title area 401 displays a text "Subject". When the user inputs characters on the software keyboard screen, the input characters are reflected on "Subject".

The software keyboard screen includes an input character display area (hereinafter referred to as an input area) 402 which displays character(s) input by the user. A text "Thanks" has already been input in the subject display field 303 illustrated in FIG. 3, and the text "Thanks" is also displayed in the input area 402 illustrated in FIG. 4.

The software keyboard screen includes a key area 403. By the user selecting a key displayed in the key area 403 through a touch operation, the character corresponding to the selected key is input to the input area 402. Referring to FIG. 4, alphabetical characters and symbols are displayed as keys.

The software keyboard screen displays a Cancel button 404. In response to the user pressing the Cancel button 404, the CPU 111 cancels the character(s) input on the software keyboard screen and displays the screen previously displayed before the software keyboard screen on the display 122.

The software keyboard screen also displays an "OK" key 405. With the user touching the "OK" key 405, the CPU 111 stores the text currently displayed in the input area 402 in a hard disk drive (HDD) 104. The CPU 111 further displays the screen previously displayed before the software keyboard screen on the display 122. In this case, the CPU 111 displays on the display 122 the previous screen in a state where the text input in the input area 402 corresponding to the title area 401 is input in a display field.

The software keyboard screen also displays an input mode selection button 406. In response to the user touching the input mode selection button 406, input modes for selecting the input method, such as "Alphanum" (representing alphanumeric), "Symbols", and "Roman Characters", are displayed in a pull-down menu. The user can change the input method and the contents displayed in the key area 403 by specifying an input mode from the pull-down menu. For example, the "Alphanum" input mode illustrated in FIG. 4 is an input mode for inputting general alphanumeric characters and symbols. In response to the user changing the input mode selection button 406 to the "Symbols" input mode, keys for inputting symbols are displayed in the key area 403 (not illustrated).

The same software keyboard screen as the one illustrated in FIG. 4 is also displayed on the display 159 of the information processing apparatus 103 connected through VNC as described above. By searching for and clicking a key on the software keyboard screen displayed on the display 159 with the mouse 161, the user can input a character to the image processing apparatus 101. Moreover, the user can input a character by using the keyboard 158 connected to the information processing apparatus 103. Processing for inputting a character with operation of the mouse 161 and processing for inputting a character from the keyboard 158 will be described in detail below.

As an example of a screen for displaying the software keyboard, FIG. 4 illustrates a screen for inputting a subject in a case of reading a document with the scanner 125 to generate image data and transmitting the generated image data by e-mail. In addition to the above-described software keyboard screen, the CPU 111 displays a screen for inputting a title of image data in a case of storing image data generated by reading a document with the scanner 125 in a storage device such as a HDD and server. The screen for displaying the software keyboard screen may be a screen for inputting a name and mail address to be registered to an address book for managing transmission destinations for facsimile and e-mail.

Screens displayed on the display 122 of the image processing apparatus 101 according to the present exemplary embodiment will be described below with reference to FIGS. 5A to 5D. A flow of processing for inputting a character from the keyboard 158 of the information processing apparatus 103 according to the present exemplary embodiment will be described below with reference to FIG. 7. According to the present exemplary embodiment, when the software keyboard screen is displayed on the display 122 of the image processing apparatus 101, the CPU 111 accepts characters input from the keyboard 158.

FIGS. 5A to 5D illustrate examples of screens displayed on the display 122 of the image processing apparatus 101. When the image processing apparatus 101 and the information processing apparatus 103 are connected with each other through VNC, a screen which is the same as the one displayed on the display 122 of the image processing apparatus 101 is also displayed on the display 159 of the information processing apparatus 103.

Figure 8:
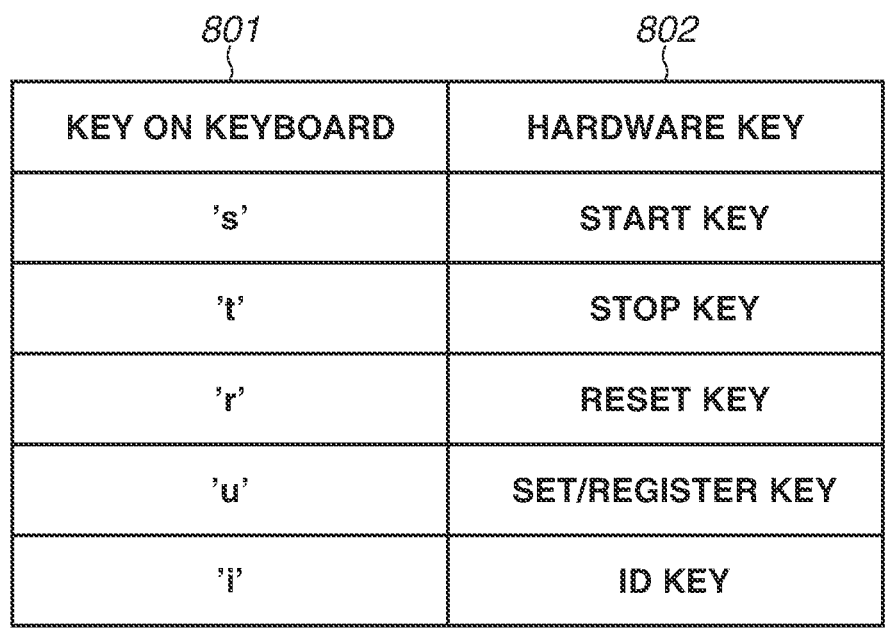
FIG. 8 schematically illustrates a character code conversion table according to one or more aspects of the present disclosure.

FIG. 8 schematically illustrates a hardware key conversion table. The hardware key conversion table stored in the ROM 113 or the external memory 123 is used to associate a character code received by the CPU 111 from the information processing apparatus 103 with the key code of a hardware key 121 of the image processing apparatus 101. Referring to FIG. 8, a column 801 indicates the conversion source character code which is a character code received by the image processing apparatus 101 from the information processing apparatus 103. For convenience, the column 801 indicates each key on the keyboard 158 instead of the character code. A column 802 indicates the key code of each hardware key 121 of the image processing apparatus 101 corresponding to each key on the keyboard 158. For convenience, the column 802 indicates the name of each hardware key 121 instead of the key code of each hardware key 121. The key code of the hardware keys 121 of the image processing apparatus 101 is a code for identifying each of the hardware keys 121 of the image processing apparatus 101. The key code includes an alphanumeric character string. The user of the information processing apparatus 103 is informed of the association between the keys on the keyboard 158 and the hardware keys 121 of the image processing apparatus 101 in advance through, for example, an operation manual.

Figure 5A:
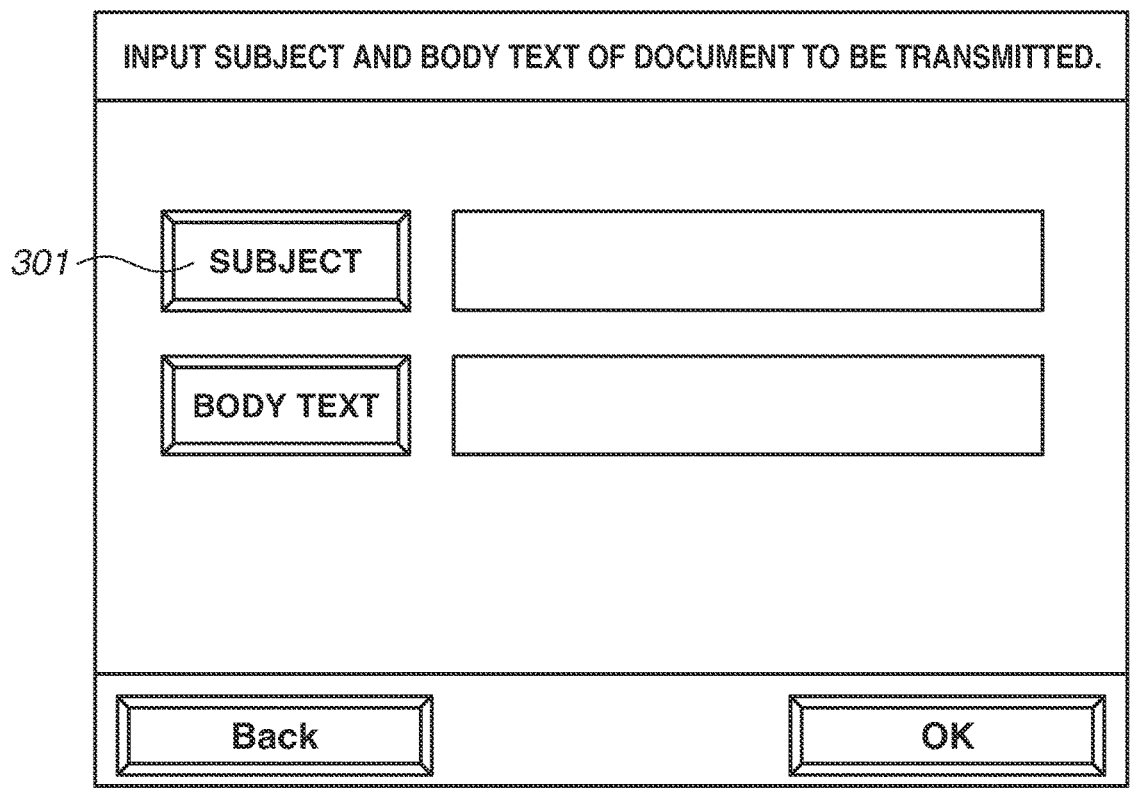
FIGS. 5A to 5D illustrate examples of screens displayed on the display of the image processing apparatus according to one or more aspects of the present disclosure.

First of all, the image processing apparatus 101 and the information processing apparatus 103 start VNC connection to allow the user to remotely operate the image processing apparatus 101 from the information processing apparatus 103. At this time, a screen which is the same as the one displayed on the display 122 of the image processing apparatus 101 is also displayed on the display 159 of the information processing apparatus 103. For example, when the screen illustrated in FIG. 5A is displayed on the display 122 of the image processing apparatus 101, the screen illustrated in FIG. 5A is also displayed on the display 159 of the information processing apparatus 103.

The user moves the mouse 161 of the information processing apparatus 103 to move the pointer to the "Subject" key 301 and clicks the "Subject" key 301. Then, the CPU 111 of the image processing apparatus 101 determines that the "Subject" key 301 is touched and displays a screen for inputting a subject illustrated in FIG. 5B on the display 122.

Figure 5B:
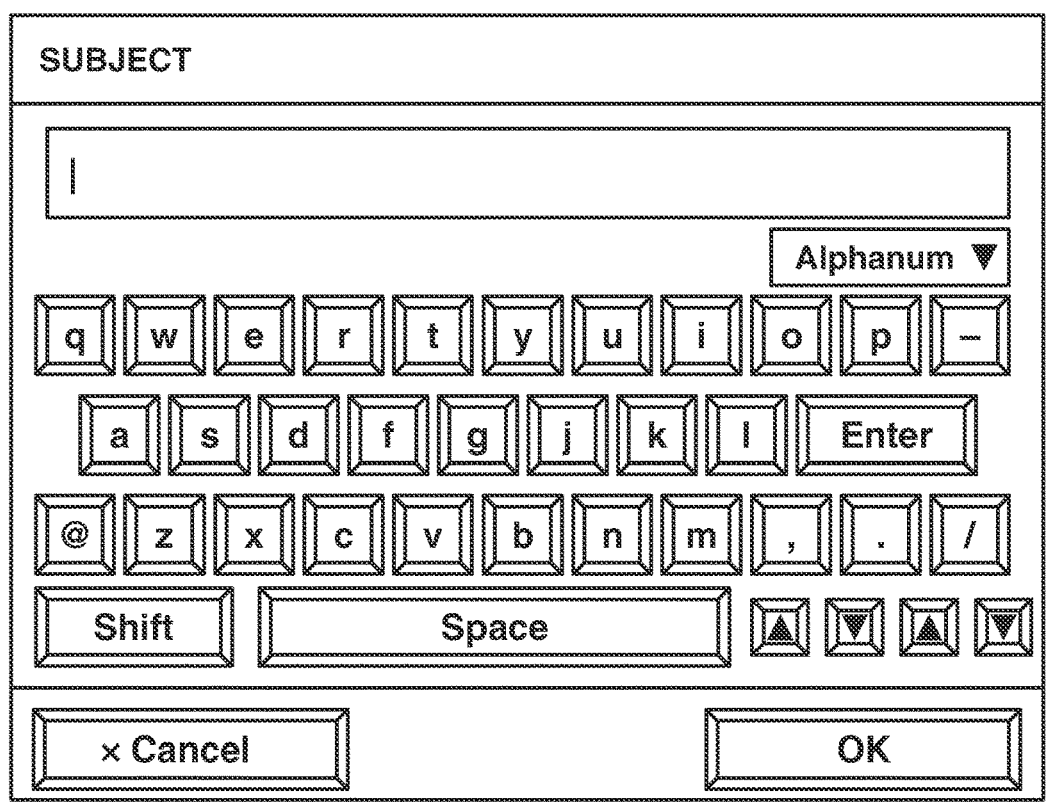

The screen reception unit 214 of the information processing apparatus 103 receives the data of a screen transmitted by the screen transmission unit 222 of the image processing apparatus 101 and displays the screen illustrated in FIG. 5B on the display 159 of the information processing apparatus 103.

Figure 5C:
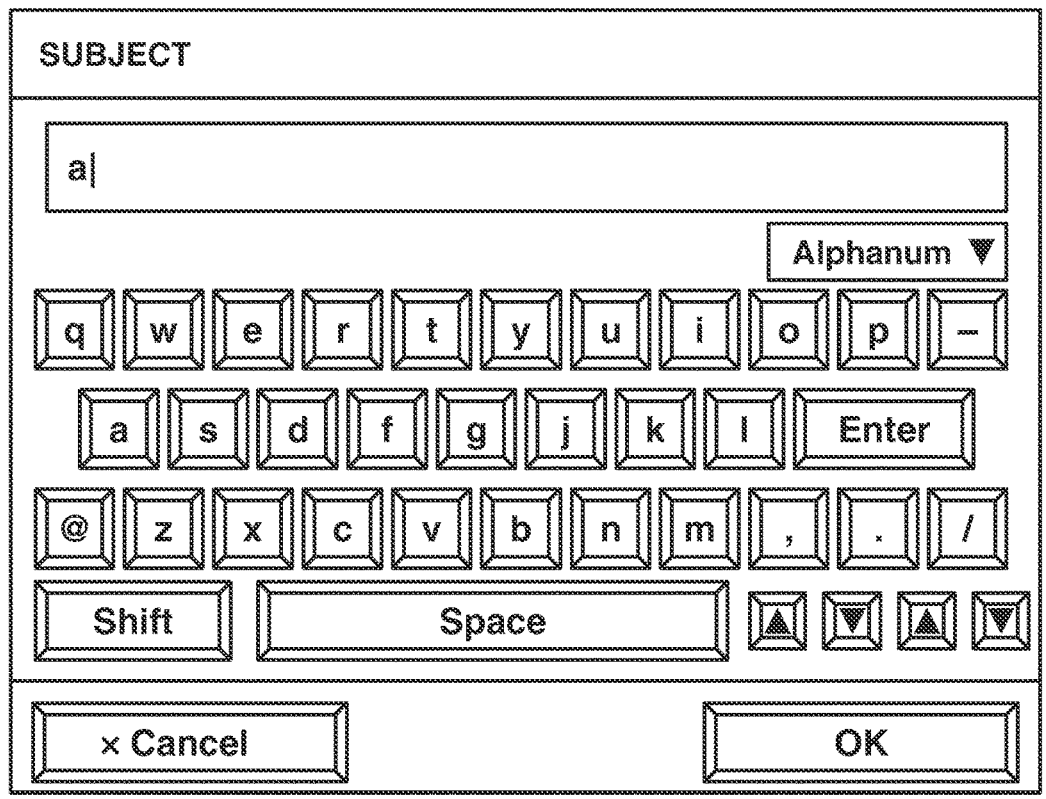

In a state where the software keyboard screen illustrated in FIG. 5B is displayed on the display 159 of the information processing apparatus 103, the user presses a key on the keyboard 158 of the information processing apparatus 103. For example, when the user presses the "a" key on the keyboard 158, the operation information transmission unit 213 of the information processing apparatus 103 transmits the character code corresponding to the "a" key. The CPU 111 of the image processing apparatus 101 inputs "a" in the input area 402 according to the received character code. Then, the screen illustrated in FIG. 5C is displayed. The CPU 111 sends a screen with an input character reflected thereto from the screen transmission unit 222 to the screen reception unit 214. Then, the screen illustrated in FIG. 5C is also displayed on the display 159 of the information processing apparatus 103. In this way, when the software keyboard for inputting characters is displayed on the display 122 of the image processing apparatus 101, the user is able to input characters from the keyboard 158 of the information processing apparatus 103 connected via the network 102.

In some cases, a screen other than one accepting text input may be displayed on the display 122 of the image processing apparatus 101. For example, the user cannot input characters on a Copy screen illustrated in FIG. 5D. In displaying such a screen, the user performs an operation on the image processing apparatus 101 with a hardware key 121, for example, the user presses the Start button to perform processing for starting a copy job. Suppose a case where, while such a screen is being displayed on the display 122 of the image processing apparatus 101, the user presses a key on the keyboard 158 of the information processing apparatus 103. In such a case, based on the hardware key conversion table illustrated in FIG. 8, the CPU 111 performs processing which is to be performed in the case of depressing of the hardware key 121 of the image processing apparatus 101, corresponding to the key on the keyboard 158 pressed by the user.

The operation information reception unit 221 of the image processing apparatus 101 receives the character code of the key pressed by the user from the operation information transmission unit 213 of the information processing apparatus 103, and determines whether the hardware key 121 of the image processing apparatus 101 corresponding to the received character code is registered in the hardware key conversion table. In the case where the corresponding hardware key 121 is registered, the image processing apparatus 101 performs processing which is to be performed with (corresponding to) depressing of the corresponding hardware key 121.

Figure 5D:
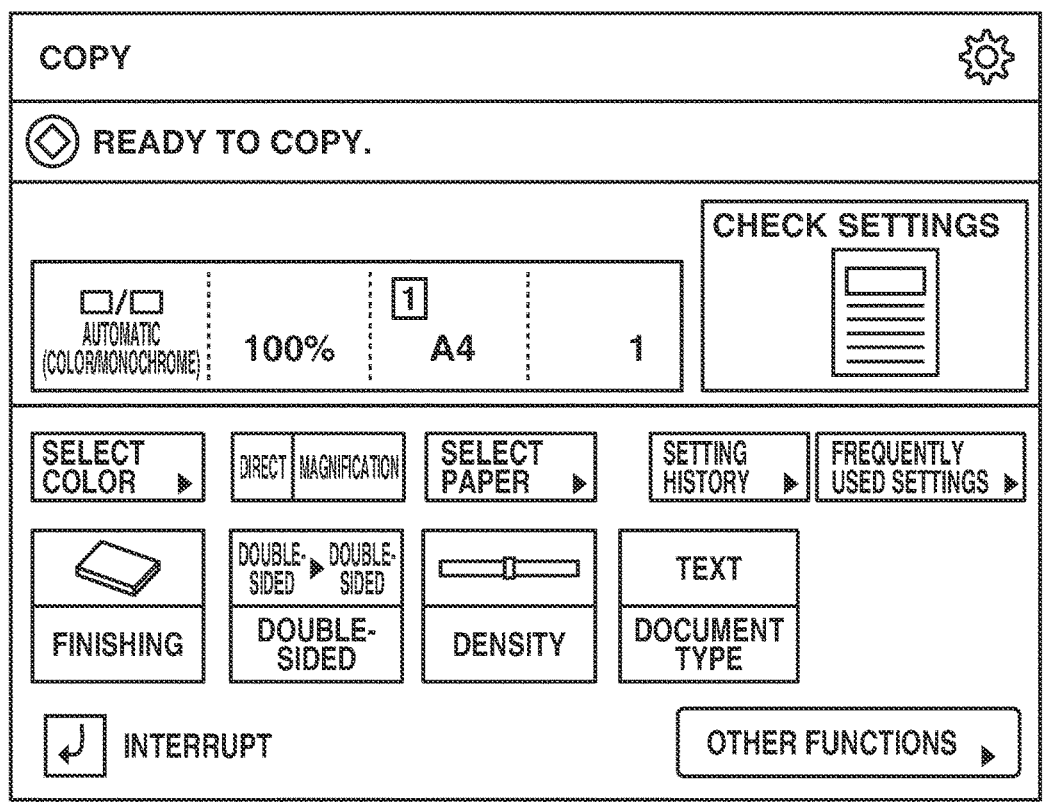

For example, suppose that, in a state where the copy screen illustrated in FIG. 5D is displayed on the display 122 of the image processing apparatus 101, the user presses the "s" key on the keyboard 158 of the information processing apparatus 103. In accordance with the hardware key conversion table illustrated in FIG. 8, the "s" key on the keyboard 158 of the information processing apparatus 103 corresponds to the Start key of the hardware keys 121 of the image processing apparatus 101. The CPU 111 of the image processing apparatus 101 then performs processing for starting a copy job.

Figure 6:
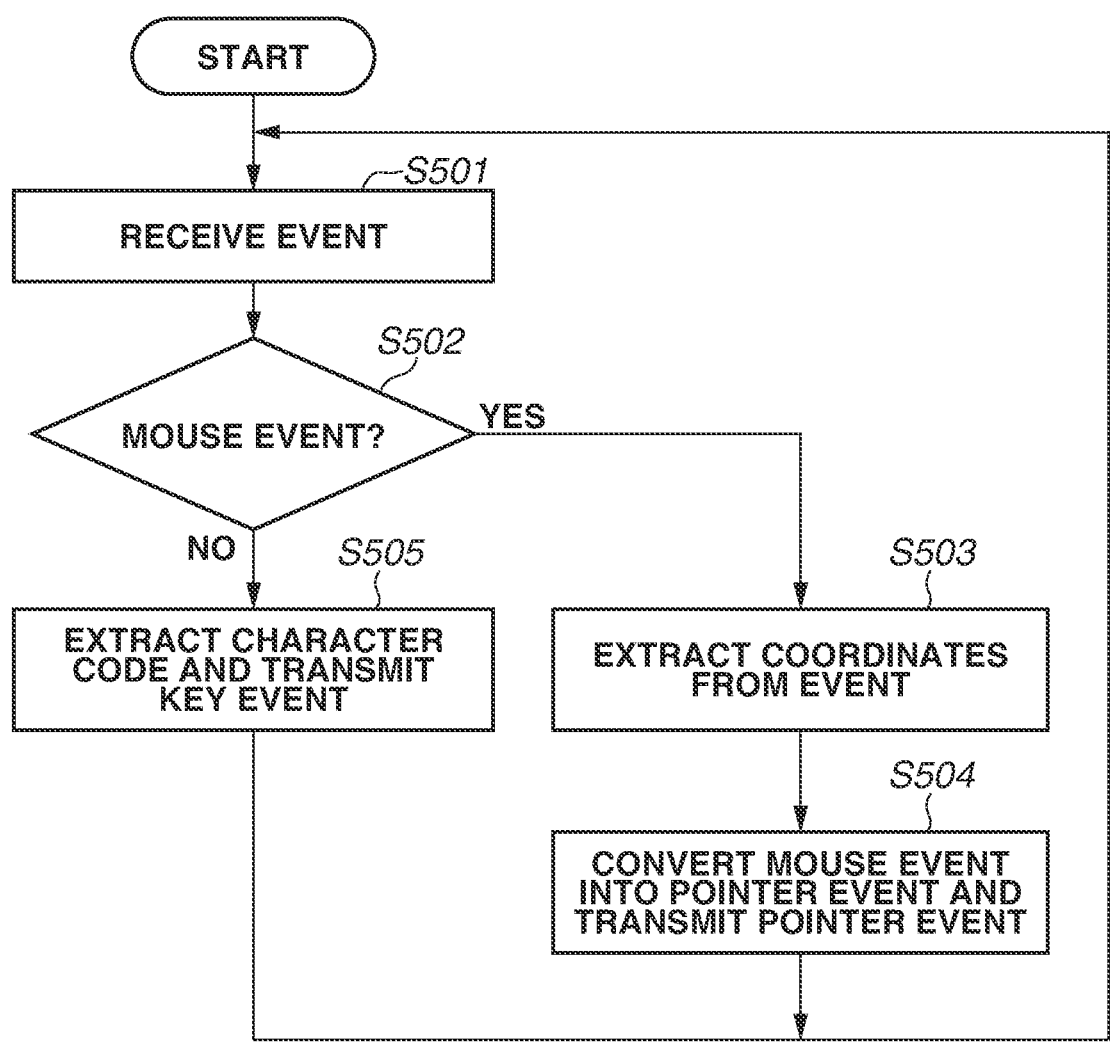
FIG. 6 is a flowchart illustrating detailed processing of an information processing apparatus according to one or more aspects of the present disclosure.

FIG. 6 is a flowchart illustrating input event processing on the VNC client 210 in the information processing apparatus 103. The processing described below is implemented by the CPU 151 loading a program stored in the ROM 153 or the external memory 160 into the RAM 152 and executing the program.

In step S501, the CPU 151 receives an event from the mouse 161 or the keyboard 158. More specifically, the input unit 154 receives an input signal from the keyboard 158 or the mouse 161 and transmits the input signal to the operation input analysis unit 212.

In step S502, the CPU 151 determines whether the received event is a mouse event. The mouse event refers to an event where the user clicks the mouse 161 of the information processing apparatus 103 and an event where the user moves the pointer by using the mouse 161. If the CPU 151 receives a mouse event (YES in step S502), the processing proceeds to step S503. In step S503, the CPU 151 extracts coordinates information for the mouse event occurrence from the received mouse event. The coordinates information for the mouse event occurrence is information indicating the position at which the mouse event has occurred on the screen displayed on the display 122. For example, in a case where an event where the user clicks the mouse 161 occurs, the CPU 151 extracts the clicked position as x- and y-coordinates assuming that any one of the four corners of the screen of the image processing apparatus 101 displayed on the display 159 as an origin. The operation input analysis unit 212 notifies the operation information transmission unit 213 of the mouse event and the calculated coordinates.

In step S504, the operation information transmission unit 213 converts the mouse event into a pointer event and transmits the pointer event to the image processing apparatus 101. A pointer event can handle inputs by mouse, pen, and touch operations in a congregational manner. The present exemplary embodiment will be described below centering on a case where the CPU 151 of the information processing apparatus 103 converts a mouse event into a pointer event and transmits the pointer event to the image processing apparatus 101. The information processing apparatus 103 however may convert the mouse event to the image processing apparatus 101 without converting a mouse event.

When the CPU 151 ends event transmission, the processing returns to step S501. In step S501, the CPU 151 waits for the reception of the next event.

In a case where the event received by the CPU 151 is not a mouse event, i.e., in a case where the received event is a key event (NO in step S502), the processing proceeds to step S505. In step S505, the CPU 151 transmits the key event received from the keyboard 158 to the image processing apparatus 101. More specifically, the operation input analysis unit 212 extracts the character code of the pressed key from the key event information received by the CPU 151 and notifies the operation information transmission unit 213 of the character code. A character code refers to a code corresponding to a character based on a character code system, such as the American Standard Code for Information Interchange (ASCII) code. The operation information transmission unit 213 then transmits a key event to the VNC server 206 in the image processing apparatus 101 as a connection destination. A key event refers to information about the depression of a key on the keyboard 158 and the character code extracted from the key event information. Upon completion of the key event transmission, the processing returns to step S501. In step S501, the CPU 151 waits for the reception of events from the mouse 161 and the keyboard 158 again.

Figure 7:
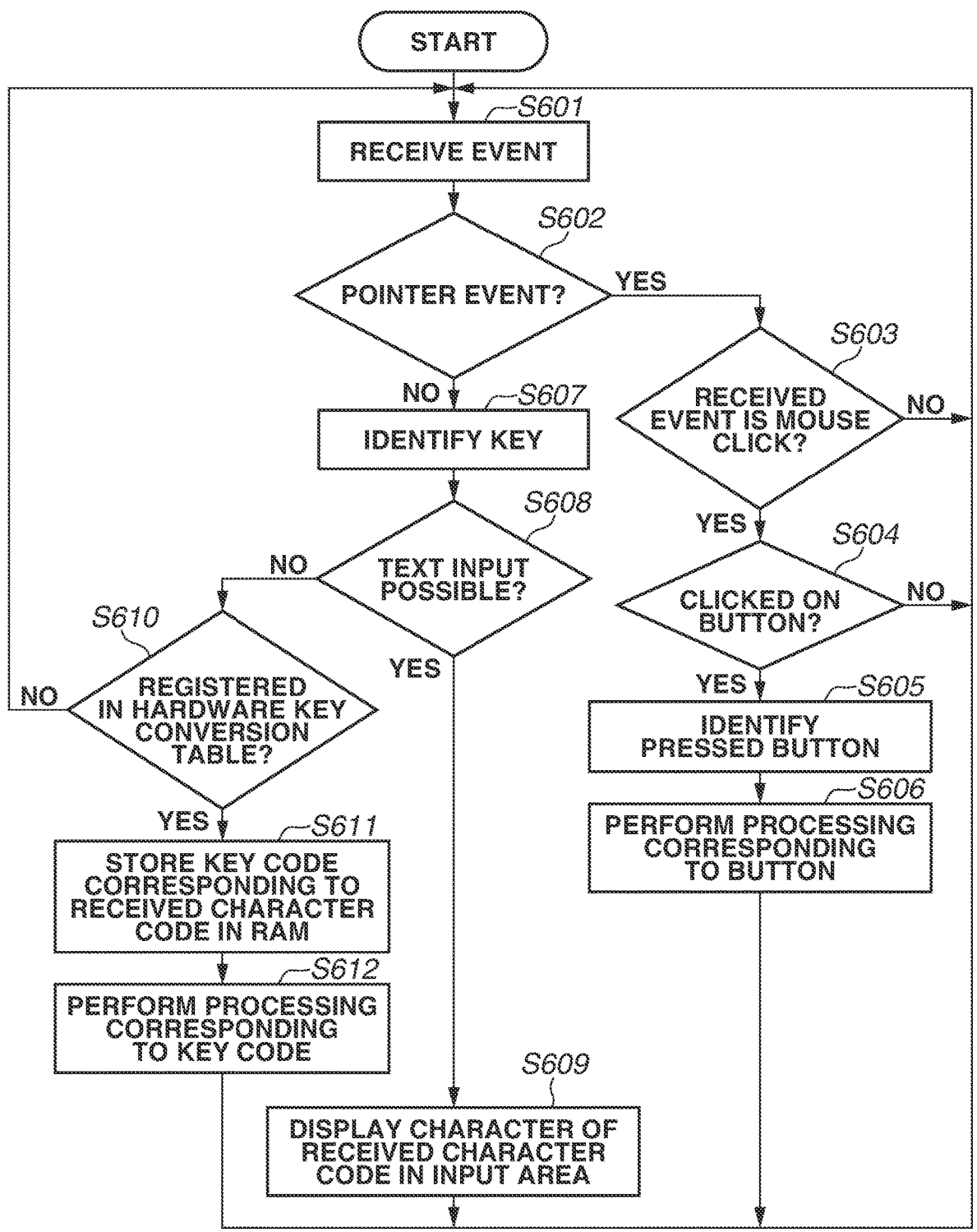
FIG. 7 is a flowchart illustrating detailed processing of the image processing apparatus according to one or more aspects of the present disclosure.

FIG. 7 is a flowchart illustrating processing performed by the image processing apparatus 101 when the VNC server 206 receives operation information from the VNC client 210. The processing to be described below is implemented by the CPU 111 loading a program stored in the ROM 113 or the external memory 123 into the RAM 112 and executes the program.

In step S601, the CPU 111 receives an event from the information processing apparatus 103. More specifically, the operation information reception unit 221 receives operation information about a mouse or keyboard operation from the VNC client 210.

In step S602, the CPU 111 determines whether the event received from the VNC client 210 is a pointer event. More specifically, the operation information reception unit 221 determines whether the event received from the VNC client 210 is a pointer event.

If the CPU 111 determines that the received event is a pointer event (YES in step S602), the processing proceeds to step S603. In step S603, the CPU 111 determines whether the received pointer event is a mouse click. If the received event is not an event of a mouse click (NO in step S603), the processing returns to step S601. In step S601, the CPU 111 waits for the reception of the next event. The present exemplary embodiment will be described on the premise that the CPU 111 performs no processing in a case where the received event is not a pointer event. However, in a case where a received event is a predetermined event other than a pointer event, the CPU 111 may perform predetermined processing. For example, suppose a case where, when a list of print products is displayed on the display 122, the user performs a drag operation of the mouse 161 on the list. The image processing apparatus 101 may receive a drug event from the information processing apparatus 103 and perform processing for scrolling the list.

If the event received by the CPU 111 is an event of a mouse click (YES in step S603), the processing proceeds to step S604. In step S604, the CPU 111 determines whether the clicked position is a position on a certain button. More specifically, the operation information reception unit 221 determines whether the clicked position is a position on a certain button based on the coordinates information notified from the received pointer event and the screen currently displayed on the display 122.

If the CPU 111 determines that the clicked position is a position in which no button is displayed on the screen (NO in step S604), the processing returns to step S601. In step S601, the CPU 111 waits for the next event.

If the CPU 111 determines that the clicked position is a position on a certain button (YES in step S604), the processing proceeds to step S605. In step S605, the CPU 111 identifies which button on the screen clicked with the mouse 161 by the user. More specifically, on the basis of the screen currently displayed on the display 122 and the coordinates of the notified pointer event, the operation information reception unit 221 identifies which button on the screen clicked with the mouse 161 by the user. If the clicked position is a position in which no button is displayed (NO in step S604), the processing returns to step S601. In step S601, the CPU 111 waits for the next event.

In step S606, the CPU 111 performs processing corresponding to the button clicked with the mouse 161 of the information processing apparatus 103 by the user. For example, suppose that the user clicked the "a" key in a key area 403 with the mouse 161 of the information processing apparatus 103 while the software keyboard screen illustrated in FIG. 4 is being displayed. The operation information reception unit 221 receives a pointer event including information about the coordinates of the position clicked by the mouse 161 from the operation information transmission unit 213. On the basis of the information about the pointer event received from the information processing apparatus 103, the image processing apparatus 101 identifies that a click operation has been performed at a position having the coordinates of the "a" key and displays "a" in the input area 402.

In this case, the CPU 111 may perform the following processing to enable the user to visually recognize the depression of the button corresponding to the clicked key. For example, the CPU 111 may perform processing for once changing the color of the corresponding button in the key area 403 and returning the color to the original one or processing for displaying an animation expressing that the button is being pressed.

The above-described exemplary embodiment has been described centering on an example case where the software keyboard screen is displayed on the display 122. However, for example, even in a case where a screen other than the software keyboard screen is displayed on the display 122 as illustrated in FIG. 5D, the CPU 111 identifies the operated button based on the notified coordinates and performs processing corresponding to the clicked position.

Upon completion of the processing in step S606, the processing returns to step S601. In step S601, the CPU 111 waits for the next event.

In step S602, if the CPU 111 determines that the event information received by the image processing apparatus 101 is not a pointer event, i.e., if the CPU 111 determines that the received event information is a key event (NO in step S602), the processing proceeds to step S607. The CPU 111 then performs the following processing.

In step S607, the CPU 111 identifies the pressed key based on the received key event information. More specifically, the operation information reception unit 221 acquires the character code notified as a key event.

In step S608, the CPU 111 determines whether the text input state is entered. According to the present exemplary embodiment, the text input state refers to a state where the software keyboard screen as illustrated in FIG. 4 is displayed on the display 122 of the image processing apparatus 101. The software keyboard control unit 250 stores information about whether the software keyboard screen is currently displayed on the display 122. The CPU 111 refers to the information to determine whether the software keyboard screen is currently displayed on the display 122. The RAM 112 stores a flag for indicating whether the screen currently displayed on the display 122 is the software keyboard screen. The CPU 111 refers to this flag in the RAM 112. With the flag being ON, the CPU 111 determine that the software keyboard screen is currently displayed on the display 122. With the flag being OFF, the CPU 111 determines that a screen other than the software keyboard screen is currently displayed on the display 122.

If the image processing apparatus 101 is in the text input state (YES in step S608), the processing proceeds to step S609. In step S609, the CPU 111 displays the character corresponding to the received character code in the input area 402. For example, in a case where the CPU 111 receives the character code of "a" while the software keyboard screen illustrated in FIG. 4 is being displayed on the display 122, the CPU 111 additionally displays character "a" corresponding to the received character code in the input area 402. In addition, in a case where, for example, the CPU 111 receives the character code of the right arrow key for moving the cursor to the right, the CPU 111 moves the cursor in the input area 402 to the right.

In this case, to enable the user to recognize the depression of the button (for example, "a") corresponding to the received character code, the CPU 111 may perform animation display in such a manner that the image of the corresponding button in the key area 403 is momentary changed and the image is returned to the original one. The positions of buttons corresponding to the character codes are stored in the ROM 113 and the external memory 123. When the CPU 111 changes the color of the button corresponding to the received character code, the color of the button corresponding to the received character code can be changed.

In steps S608 and S609, the CPU 111 determines whether the image processing apparatus 101 is in a state to receive text input and, while the image processing apparatus 101 is accepting text input, inputs the character corresponding to the received character code. In this way, while the image processing apparatus 101 is accepting text input, the user can input to the image processing apparatus 101 a character from the keyboard 158 of the information processing apparatus 103 connected via the network 102.

In step S608, if the image processing apparatus 101 is not in the text input state (NO in step S608), the processing proceeds to step S610. In step S610, the CPU 111 determines whether the received character code is registered in the hardware key conversion table. The CPU 111 determines, based on the information in the hardware key conversion table illustrated in FIG. 8, whether the hardware key 121 corresponding to the received character code is registered in the hardware kay conversion table.

An example of the hardware key conversion table is illustrated in FIG. 8.

In step S610, if the character code received by the CPU 111 is not registered in the hardware key conversion table (NO in step S610), the processing returns to step S601. In step S601, the CPU 111 waits until the image processing apparatus 101 receives an event from the information processing apparatus 103.

In step S610, if the received character code is registered in the hardware key conversion table (YES in step S610), the processing proceeds to step S611. In step S611, the CPU 111 stores in the RAM 112 the key code of the hardware key 121 corresponding to the received character code. For example, if the user presses the "s" key on the keyboard 158 of the information processing apparatus 103, the CPU 111 identifies the hardware key 121 corresponding to the received character code of "s" based on the hardware key conversion table. The hardware key conversion table illustrated in FIG. 8 indicates that the "s" key on the keyboard 158 corresponds to the Start key of the image processing apparatus 101. The CPU 111 then stores the key code of the "Start key" in the RAM 112.

In step S612, the CPU 111 operates the image processing apparatus 101 according to the key code stored in the RAM 112. After the CPU 111 operates the image processing apparatus 101 according to the key code stored in the RAM 112, the processing returns to step S601. In step S601, the CPU 111 waits for the reception of the next event from the information processing apparatus 103. The first exemplary embodiment has been described above centering on a case where, after storing in the RAM 112 the key code corresponding to the received character code, the CPU 111 performs processing corresponding to the stored key code. However, the CPU 111 does not necessarily need to perform the processing corresponding to the key code of the hardware key 121 in step S612. For example, the SEND function for sending scan image data attached to an e-mail may be unable to start a job if a transmission destination is not set. In such a case, if the image processing apparatus 101 receives the character code of "s", the CPU 111 does not perform an operation for starting a job when the user presses the hardware key 121 corresponding to the character code of "s".

According to the first exemplary embodiment, a plurality of types of screens can be displayed on the display 122 of the image processing apparatus 101.

According to the first exemplary embodiment, the display 122 of the image processing apparatus 101 displays the character code received from the information processing apparatus 103 and displays a screen with which processing to be performed with (corresponding to) depression of the hardware key 121 corresponding to the character code is not performed. With this configuration, the user can input characters by using the hardware keyboard 158 of the information processing apparatus 103 while a screen for text input is being displayed. In this way, the user familiar with a keyboard can input characters quicker than a case of clicking the on-screen software keyboard with the mouse 161 in inputting texts.

According to the first exemplary embodiment, the CPU 111 displays a screen which enables the execution of the processing to be performed with the depression of the hardware key 121 corresponding to the character code without displaying the character of the character code on the image processing apparatus 101. Thus, by using the hardware keyboard 158 of the information processing apparatus 103, the user can perform an operation equivalent to an operation to be performed with the depression of the hardware key 121 of the image processing apparatus 101.

The present exemplary embodiment has been described above centering on an example case where the software keyboard with the "Alphanum" input mode is displayed on the display 122. However, the user can select any input mode by using the input mode selection button 406 on the software keyboard screen.

For example, in a case where the software keyboard for inputting a symbol is displayed on the display 122 in the "Symbols" input mode, the CPU 111 determines that the image processing apparatus 101 is in the text input state. In a case where the user presses the keyboard 158 of the information processing apparatus 103 in this case, the character of the character code received by the image processing apparatus 101 is displayed in the input area 402. Thus, in a case where the user presses the "a" key on the keyboard 158 in the "Symbols" input mode, the CPU 111 displays "a" in the input area 402. In this way, the user can input both characters and symbols without changing the input mode of the software keyboard displayed on the display 159.

According to the first exemplary embodiment, when the screen displayed on the display 122 is a screen not allowing text input, the CPU 111 stores in the RAM 112 the key code of the hardware key 121 corresponding to the received character code. However, the CPU 111 does not necessarily need to store in the RAM 112 the key code of the hardware key 121 corresponding to the character code. After performing the processing in step S610, the CPU 111 determines whether the processing to be performed with the depression of the hardware key 121 corresponding to the received character code can be performed. Only in a case where the processing to be performed with the depression of the hardware key 121 is executable, the CPU 111 stores in the RAM 112 the key code of the hardware key 121 corresponding to the character code. For example, the SEND function for sending scan image data by e-mail may be unable to start a job in a case where a transmission destination is not set. Thus, in a case where the character code of "s" is received in a state where the image processing apparatus 101 cannot start a job, the CPU 111 does not store in the RAM 112 the key code corresponding to the character code received after performing the processing in S610.

According to the first exemplary embodiment, the CPU 111 of the image processing apparatus 101 performs the processing illustrated in FIG. 7. However, an exemplary embodiment is not limited to a case where the CPU 111 for performing processing is included in the image processing apparatus 101. For example, a case is applicable in which a computer connected to the image processing apparatus 101 controls the image processing apparatus 101, and a CPU in the computer performs the processing according to the first exemplary embodiment.

A second exemplary embodiment of the present disclosure will be described below. According to the first exemplary embodiment, after receiving a character code, the image processing apparatus 101 determines whether the screen currently displayed on the display 122 is a screen allowing text input. Alternatively, the information processing apparatus 103 may determine whether the image processing apparatus 101 is in the text input state when the user presses a key on the keyboard 158. The information processing apparatus 103 stores the association between the character codes and the key codes of the hardware keys 121 of the image processing apparatus 101. With the screen displayed on the display 122 of the image processing apparatus 101 being a screen not allowing text input, the information processing apparatus 103 transmits the key code of the hardware key 121 corresponding to the character code to the image processing apparatus 101. In this way, the information processing apparatus 103 can perform processing without identifying the key code of the hardware key 121 corresponding to the character code received in the image processing apparatus 101.

The CPU 111 of the image processing apparatus 101 notifies the information processing apparatus 103 of display information indicating whether the screen displayed on the display 122 is a screen allowing text input. The information about whether a screen allowing text input is currently displayed on the display 122 is stored in the software keyboard control unit 250. The CPU 111 notifies the information processing apparatus 103 of the information stored in the software keyboard control unit 250. This information notification may be performed each time the screen displayed on the display 122 changes or at predetermined time intervals.

Figure 9:
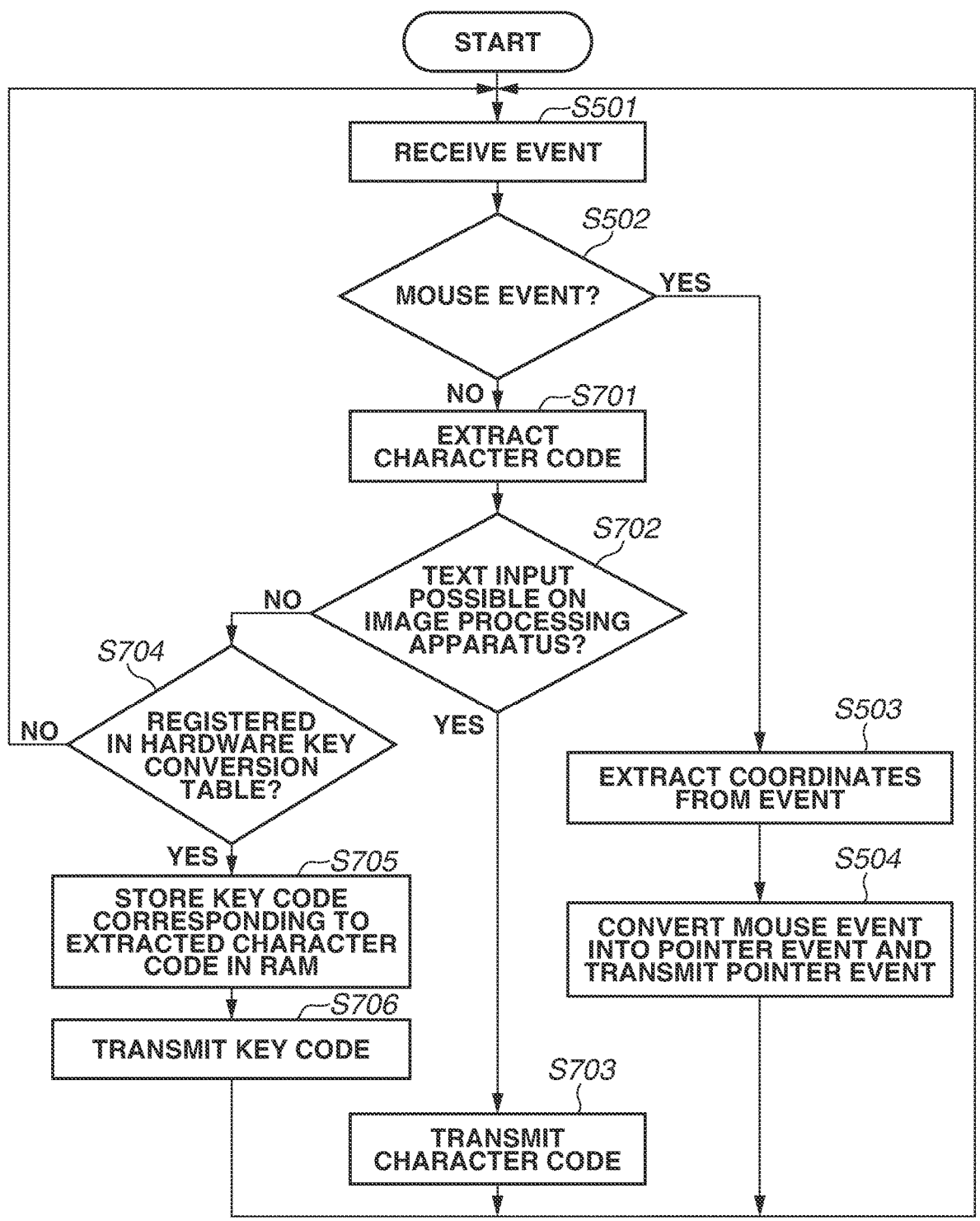
FIG. 9 is a flowchart illustrating detailed processing of an information processing apparatus according to one or more aspects of the present disclosure.

FIG. 9 is a flowchart illustrating processing performed by the CPU 151 in the information processing apparatus 103. A program for implementing the processing illustrated in FIG. 9 is stored in the ROM 153 or the external memory 160 of the information processing apparatus 103. The processing is implemented by the CPU 151 reading and executing the program. Processing in steps S501 to S504 is similar to the processing in the same step numbers according to the first exemplary embodiment, and redundant descriptions thereof will be omitted.

In step S502, if the event received by the CPU 151 is a key event (NO in step S502), the processing proceeds to step S701. In step S701, the CPU 151 extracts the character code of the pressed key in the received key event.

After extracting the character code, in step S702, the CPU 151 determines whether the screen currently displayed on the display 122 of the image processing apparatus 101 is a screen allowing text input. The CPU 151 determines whether the screen currently displayed on the display 122 of the image processing apparatus 101 is in the text input state, based on the above-described display information notified from the image processing apparatus 101.

If the screen currently displayed on the display 122 is a screen allowing text input (YES in step S702), the processing proceeds to step S703. In step S703, the CPU 151 transmits the extracted character code to the image processing apparatus 101. After the CPU 151 transmits the extracted character code to the image processing apparatus 101, the processing returns to step S501. In step S501, the CPU 151 waits for the reception of the next event.

If the screen currently displayed on the display 122 is a screen not allowing text input (NO in step S702), the processing proceeds to step S704. In step S704, the CPU 151 determines whether the hardware key 121 corresponding to the extracted character code exists in the hardware key conversion table. The CPU 151 searches for the hardware key 121 corresponding to the extracted character code by using the extracted character code and the hardware key conversion table illustrated in FIG. 8.

If the corresponding hardware key 121 does not exist in the hardware kay conversion table (NO in step S704), the processing returns to step S501. In step S501, the CPU 151 receives the next event.

If the corresponding hardware key 121 exists in the hardware key conversion table (YES in step S704), the processing proceeds to step S705. In step S705, the CPU 151 stores in the RAM 152 the hardware key 121 corresponding to the extracted character code. In step S706, the CPU 151 transmits the key code stored in the RAM 152 to the image processing apparatus 101. After the CPU 151 transmits the key code, the processing returns to step S501.

Figure 10:
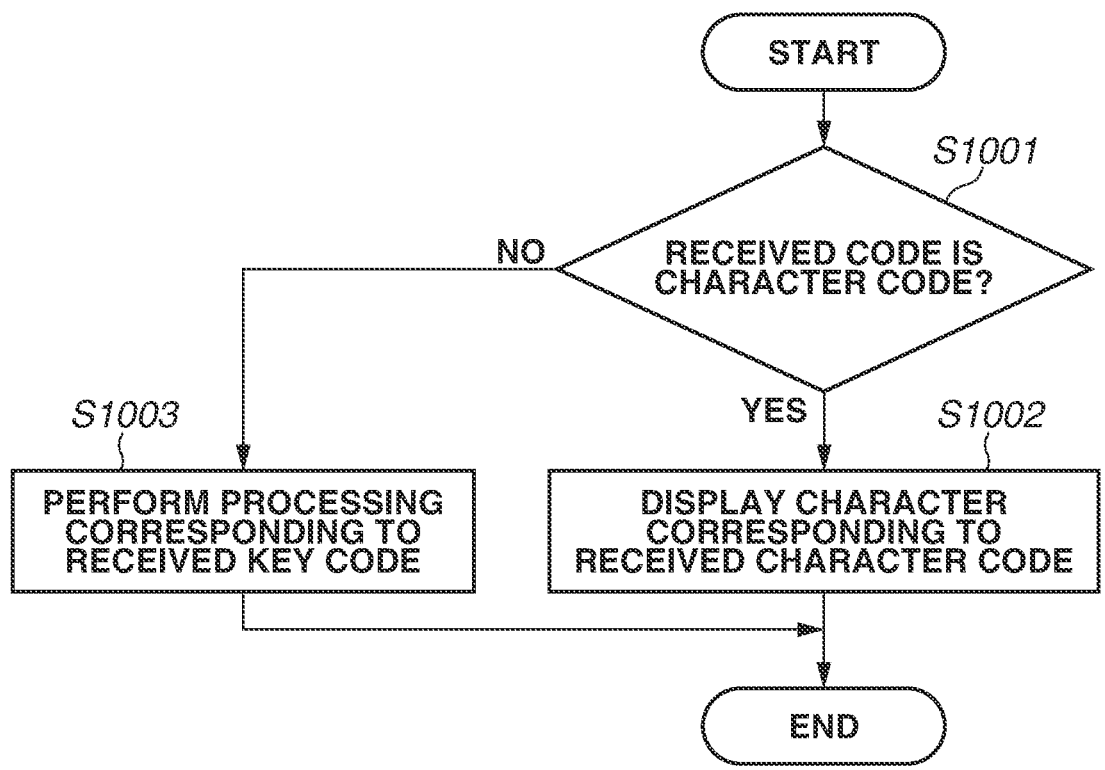
FIG. 10 is a flowchart illustrating processing of an image processing apparatus according to one or more aspects of the present disclosure.

The image processing apparatus 101 that receives the character code or the key code performs processing illustrated in FIG. 10. The processing illustrated in FIG. 10 is implemented by the CPU 111 loading a program stored in the ROM 113 or the external memory 123 into the RAM 112 of the image processing apparatus 101 and executing the program.

In step S1001, the CPU 111 determines whether the code received by the operation information reception unit 221 is a character code. If the code received by the CPU 111 is a character code (YES in step S1001), the processing proceeds to step S1002. In step S1002, the CPU 111 displays the character of the received character code on the display 122. The processing then exits the flowchart illustrated in FIG. 10. If the code received by the CPU 111 is not a character code, i.e., if the code received by the CPU 111 is a key code of the hardware key 121 (NO in step S1001), the processing proceeds to step S1003. In step S1003, the CPU 111 performs processing corresponding to the received key code. The processing then exits the flowchart illustrated in FIG. 10.

According to a second exemplary embodiment, in a case where a screen other than a screen for text input is displayed on the display 122 of the image processing apparatus 101, the information processing apparatus 103 converts a character code received from the keyboard 158 into a key code of the hardware key 121 of the image processing apparatus 101 and transmits the key code. In this way, the image processing apparatus 101 can perform processing corresponding to the received character code or key code without performing processing for converting the character code received by the image processing apparatus 101 into a hardware key 121.

Other Embodiments

The first and the second exemplary embodiments have been described above on the premise that the state where the software keyboard for inputting characters is currently displayed on the display 122 is the text input state. However, the text input state is not limited to the above-described state.

For example, suppose that the user touches the button or the display field of an input target item in the screen displaying the subject display field 303 and the body text display field 304 illustrated in FIG. 3. In this case, the CPU 111 may display the software keyboard partly overlapping with the currently displayed screen. For an item input by using, for example, a numeric keypad of the image processing apparatus 101, the text input state may be a state where the cursor is displayed in the display field in response to the user touching a display field.

Although the first and the second exemplary embodiments have been described above centering on an example of the image processing apparatus 101 not provided with a hardware keyboard, the exemplary embodiments described in the present specification may be also applicable to an image processing apparatus provided with a hardware keyboard. In such a case, in a screen displaying the subject display field 303 and the body text display field 304 as illustrated in FIG. 3, the text input state may be a state where the cursor is displayed in the display field in response to the user touching a display field.

The first and the second exemplary embodiments have been described above centering on a case where the Start key, Reset key, Stop key, Set/Register key, and ID key are hardware keys provided on image processing apparatus 101. The above-described keys may not be hardware keys. For example, the above-described keys not included in the software keyboard may be displayed on the display 122. In a case where the software keyboard is currently displayed on the image processing apparatus 101 described in the present specification, the CPU 111 displays the character corresponding to the received character code. The image processing apparatus 101 described in the present specification does not currently display the software keyboard, the image processing apparatus 101 performs processing which is to be performed with a selection of a key for performing processing different from text input processing corresponding to the received character code.

According to the first and the second exemplary embodiments, the communication between the image processing apparatus 101 and the information processing apparatus 103 is not necessarily limited to the RFB protocol, the Remote Desktop Protocol (RDP), and other original protocols may be used.

According to the first and the second exemplary embodiments, the information processing apparatus 103 transmits the character code corresponding to the pressed key to the image processing apparatus 101. However, the information processing apparatus 103 may transmit the key code corresponding to the pressed key to the image processing apparatus 101. In a case where the software keyboard is displayed on the display 122 of the image processing apparatus 101, the image processing apparatus 101 converts the received key code into a character code and displays the character code.

According to the exemplary embodiments described in the present specification, a text input screen on the display 122 of the image processing apparatus 101 enables text input from the keyboard 158 of the information processing apparatus 103, and a predetermined screen other than the above-described one enables instruction of the execution of processing which is to be performed with the depression of a hardware key 121 from the keyboard 158 of the information processing apparatus 103.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims is to be accorded the broadest interpretation so as to encompass all such modifications and equivalent structures and functions.

This application claims the benefit of Japanese Patent Application No. 2016-125589, filed Jun. 24, 2016, which is hereby incorporated by reference herein in its entirety.

What is claimed is:

1. An image processing apparatus connectable with an information processing apparatus, the image processing apparatus comprising:
   a display unit;
   a storage unit, wherein the storage unit stores information that associates a signal to be transmitted from the information processing apparatus upon a depression of a key on a keyboard of the information processing apparatus with a hardware key provided on the image processing apparatus;
   at least one processor executing instructions causing the image processing apparatus to:
   provide, to a client function of the information processing apparatus via a network, a display screen so that a screen which is the same as the one displayed on the display unit of the image processing apparatus is displayed on a display unit of the information processing apparatus;
   receive a signal transmitted from the information processing apparatus upon a depression of the key on the keyboard of the information processing apparatus in a situation that, on the display unit of the information processing apparatus, the screen which is the same as the one displayed on the display unit of the image processing apparatus is displayed based on the provided display screen;
   display, based on the received signal, a character on the screen displayed on the display unit of the image processing apparatus in a case where information about whether a software keyboard is currently displayed on the display unit of the image processing apparatus indicates that the software keyboard is currently displayed on the display unit of the image processing apparatus, and
   perform processing corresponding to the hardware key that is associated, by the information stored in the storage unit, with the received signal in a case where the information about whether the software keyboard is currently displayed on the display unit of the image processing apparatus indicates that the software keyboard is not currently displayed on the display unit of the image processing apparatus.

2. The image processing apparatus according to claim 1, wherein the information stored in the storage unit associates the signal to be transmitted from the information processing apparatus with a key code of the hardware key of the image processing apparatus.

3. The image processing apparatus according to claim 1, wherein coordinates information indicating a pointer position is received from the information processing apparatus upon a depression of a button of a mouse connected to the information processing apparatus, and wherein processing to be performed with a selection of an object at the pointer position is performed.

4. The image processing apparatus according to claim 1, wherein the received signal is at least either one of a character code and a key code.

5. The image processing apparatus according to claim 1, further comprising a reading unit configured to read a document to generate image data.

6. The image processing apparatus according to claim 1, further comprising a printing unit configured to print an image on a sheet.

7. The image processing apparatus according to claim 1, wherein the hardware key provided on the image processing apparatus includes at least one of a Start key, a Reset key, a Stop key, and a Clear key.

8. The image processing apparatus according to claim 1, wherein the image processing apparatus is connected with the information processing apparatus through Virtual Network Computing (VNC).

9. A method for controlling an image processing apparatus connectable with an information processing apparatus, the method comprising:
   storing information that associates a signal to be transmitted from the information processing apparatus upon a depression of a key on a keyboard of the information processing apparatus with a hardware key provided on the image processing apparatus;
   providing, to a client function of the information processing apparatus via a network, a display screen so that a screen which is the same as the one displayed on a display unit of the image processing apparatus is displayed on a display unit of the information processing apparatus;
   receiving a signal transmitted from the information processing apparatus upon a depression of the key on the keyboard of the information processing apparatus in a situation that, on the display unit of the information processing apparatus, the screen which is the same as the one displayed on the display unit of the image processing apparatus is displayed based on the provided display screen;
   displaying, based on the received signal, a character on the screen displayed on the display unit of the image processing apparatus in a case where information about whether a software keyboard is currently displayed on the display unit of the image processing apparatus indicates that the software keyboard is currently displayed on the display unit of the image processing apparatus, and
   performing processing corresponding to the hardware key that is associated, by the information stored in the storage unit, with the received signal in a case where the information about whether the software keyboard is currently displayed on the display unit of the image processing apparatus indicates that the software keyboard is not currently displayed on the display unit of the image processing apparatus.

10. A non-transitory storage medium storing a program for executing a method for controlling an image processing apparatus connectable with an information processing apparatus, the method comprising:

storing information that associates a signal to be transmitted from the information processing apparatus upon a depression of a key on a keyboard of the information processing apparatus with a hardware key provided on the image processing apparatus;

providing, to a client function of the information processing apparatus via a network, a display screen so that a screen which is the same as the one displayed on a display unit of the image processing apparatus is displayed on a display unit of the information processing apparatus;

receiving a signal transmitted from the information processing apparatus upon a depression of the key on the keyboard of the information processing apparatus in a situation that, on the display unit of the information processing apparatus, the screen which is the same as the one displayed on the display unit of the image processing apparatus is displayed based on the provided display screen;

displaying, based on the received signal, a character on the screen displayed on the display unit of the image processing apparatus in a case where information about whether a software keyboard is currently displayed on the display unit of the image processing apparatus indicates that the software keyboard is currently displayed on the display unit of the image processing apparatus, and performing processing corresponding to the hardware key that is associated, by the information stored in the storage unit, with the received signal in a case where the information about whether the software keyboard is currently displayed on the display unit of the image processing apparatus indicates that the software keyboard is not currently displayed on the display unit of the image processing apparatus.

* * * * *